United States Patent
Do et al.

(10) Patent No.: US 9,450,701 B2
(45) Date of Patent: Sep. 20, 2016

(54) DATA FLOW CONTROL METHOD AND APPARATUS

(75) Inventors: Manh H. Do, Vancouver (CA); Roger Chen, Shenzhen (CN)

(73) Assignee: Orbital Multi Media Holdings Corporation, Tortola (VG)

( * ) Notice: Subject to any disclaimer, the term of this patent is extended or adjusted under 35 U.S.C. 154(b) by 149 days.

(21) Appl. No.: 13/576,939

(22) PCT Filed: Feb. 3, 2011

(86) PCT No.: PCT/CA2011/000118
§ 371 (c)(1),
(2), (4) Date: Oct. 17, 2012

(87) PCT Pub. No.: WO2011/094845
PCT Pub. Date: Aug. 11, 2011

(65) Prior Publication Data
US 2013/0028088 A1    Jan. 31, 2013

(30) Foreign Application Priority Data
Feb. 3, 2010 (GB) .................................. 1001777.0

(51) Int. Cl.
H04L 12/24 (2006.01)
H04L 1/00 (2006.01)
H04L 1/16 (2006.01)
H04L 1/18 (2006.01)

(52) U.S. Cl.
CPC ........... *H04L 1/0002* (2013.01); *H04L 1/0034* (2013.01); *H04L 1/1607* (2013.01); *H04L 1/1887* (2013.01); *Y02B 60/31* (2013.01)

(58) Field of Classification Search
None
See application file for complete search history.

(56) References Cited

U.S. PATENT DOCUMENTS

| 6,526,022 B1 | 2/2003 | Chiu et al. |
| 2002/0172208 A1* | 11/2002 | Malkamaki ................... 370/400 |
| 2002/0191573 A1 | 12/2002 | Whitehill et al. |
| 2003/0003905 A1 | 1/2003 | Shvodian |
| 2006/0120282 A1* | 6/2006 | Carlson et al. ............... 370/229 |
| 2008/0049640 A1 | 2/2008 | Heinz et al. |

(Continued)

FOREIGN PATENT DOCUMENTS

| CA | 2 461 926 A1 | 4/2003 |
| CA | 2 590 965 A1 | 7/2006 |

(Continued)

*Primary Examiner* — Rhonda Murphy
(74) *Attorney, Agent, or Firm* — Blank Rome LLP

(57) ABSTRACT

There is provided a method of controlling a transmission rate of a data stream by a server transmitting the data stream to a client device over a network, the method comprising receiving a feedback message from the client, the feedback message containing information indicating a positive or negative acknowledgement of receipt for each one of a plurality of data packets of the data stream; calculating values of a plurality of metrics, wherein each of the values is indicative of transmission quality of the network and is calculated based at least in part on the information contained in the feedback message, and wherein the values include a first value of a first metric representing packet loss; and adjusting the transmission rate if at least one of the values satisfies a corresponding condition; wherein the first metric is prioritized among the plurality of metrics such that an adjustment of the transmission rate responsive to a second value of a second metric satisfying the corresponding condition is conditional on the first value of the first metric not satisfying the corresponding condition.

36 Claims, 9 Drawing Sheets

(56) References Cited

U.S. PATENT DOCUMENTS

2009/0006920 A1 1/2009 Munson et al.
2009/0147678 A1 6/2009 Xhafa et al.
2011/0096694 A1* 4/2011 Jiang .............................. 370/253

FOREIGN PATENT DOCUMENTS

| EP | 1 227 603 A1 | 7/2002 |
| EP | 1 638 234 A1 | 3/2006 |
| WO | WO 2005/109719 | 11/2005 |

* cited by examiner

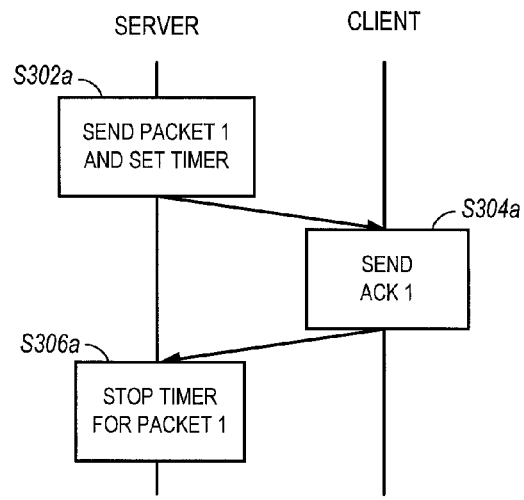
FIG. 3A
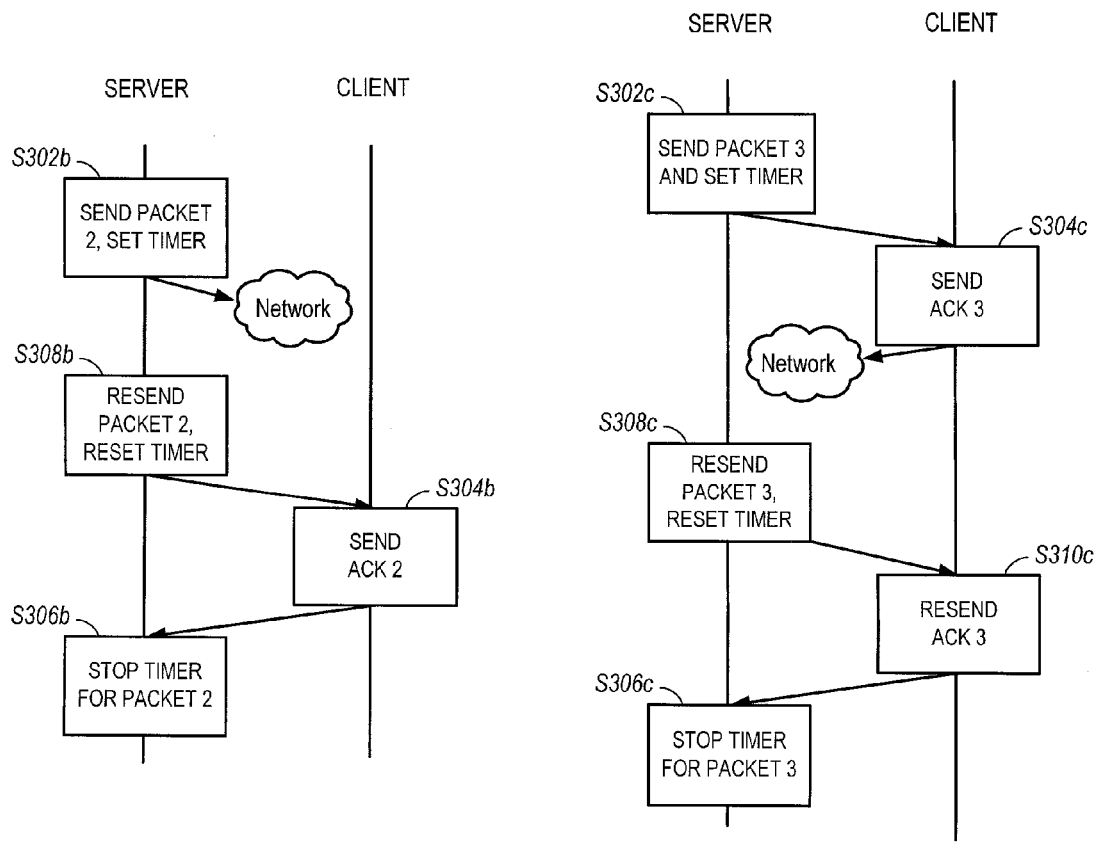
FIG. 3B
FIG. 3C

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| subtype  |   PT=APP=204  |             length            |
+-+-+-+-+-+-+-+-+-+-+-+-+-+-+-+-+-+-+-+-+-+-+-+-+-+-+-+-+-+-+-+-+
|                          SSRC/CSRC                             |
+-+-+-+-+-+-+-+-+-+-+-+-+-+-+-+-+-+-+-+-+-+-+-+-+-+-+-+-+-+-+-+-+
|                          name (ASCII)                          |
+-+-+-+-+-+-+-+-+-+-+-+-+-+-+-+-+-+-+-+-+-+-+-+-+-+-+-+-+-+-+-+-+
|                          SSRC/CSRC                             |
+-+-+-+-+-+-+-+-+-+-+-+-+-+-+-+-+-+-+-+-+-+-+-+-+-+-+-+-+-+-+-+-+
|     mask bit number           |           Seq num              |
+-+-+-+-+-+-+-+-+-+-+-+-+-+-+-+-+-+-+-+-+-+-+-+-+-+-+-+-+-+-+-+-+
|                          Mask...                               |
+-+-+-+-+-+-+-+-+-+-+-+-+-+-+-+-+-+-+-+-+-+-+-+-+-+-+-+-+-+-+-+-+
```

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|0|   FMT   |       PT      |           length             |
+-+-+-+-+-+-+-+-+-+-+-+-+-+-+-+-+-+-+-+-+-+-+-+-+-+-+-+-+-+-+-+-+
|                     SSRC of packet sender                      |
+-+-+-+-+-+-+-+-+-+-+-+-+-+-+-+-+-+-+-+-+-+-+-+-+-+-+-+-+-+-+-+-+
|                     SSRC of media source                       |
+-+-+-+-+-+-+-+-+-+-+-+-+-+-+-+-+-+-+-+-+-+-+-+-+-+-+-+-+-+-+-+-+
:            Feedback Control Information (FCI)                 :
:                                                                :
```

FIG. 5A (Prior Art)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            PID               |             BLP                 |
+-+-+-+-+-+-+-+-+-+-+-+-+-+-+-+-+-+-+-+-+-+-+-+-+-+-+-+-+-+-+-+-+
```

FIG. 5B (Prior Art)

DATA FLOW CONTROL METHOD AND APPARATUS

FIELD

The invention relates generally to data transmission over a communication network. More particularly, the invention relates to methods and apparatus for controlling a transmission rate of streaming data based on acknowledgement feedback.

BACKGROUND

Many applications, such as real-time streaming, are particularly sensitive to bandwidth limitations, network delay and packet loss. To minimize the impact to applications when such impairments do arise, a variety of Quality of Service (QoS) techniques and (QoS-aware) protocols can be implemented.

For example, RTP (Real-time Transport Protocol), and its companion protocol, RTCP (Real-time Control Protocol), provides for periodic control packets (so-called Sender Report (SR) and Receiver Report (RR) packets) to allow an application to monitor the quality of data distribution. Sender and Receiver Reports do not acknowledge individual RTP packets but rather report various statistics, such as the variation value of the arrival gap of RTP data packets (Interarrival Jitter) and fraction of RTP data packets from the source lost since the previous RR packet was sent (Fraction Lost). A round-trip time (RTT) delay and network delay can also be determined using time-based information (LSR and DLSR) carried in the reports.

However, network delay can also be a function of receive buffer management as well as router and switching equipment configurations. Thus, in certain circumstances, a determination of network delay using RR packets does not accurately reflect the actual network environment. In addition, the fraction lost number reported by RR packets is generated based on original data transmissions, i.e. without considering requested retransmissions that did not arrive at the receiver. In other words, it does not account for loss of any data in the forward transmission path. Furthermore, the fraction lost number only provides an indication of the short-term packet loss rates to a receiver. Thus, there may be some deviation compared to the actual value.

An extension to the RTCP for the Audio-Visual Profile, "RFC 4585 Extended RTP Profile for Real-time Transport Control Protocol (RTCP)-Based Feedback (RTP/AVPF)", enables receivers to provide, statistically, more immediate feedback to senders, allowing for feedback-based repair mechanisms (e.g. retransmissions) to be implemented. However, unlike TCP, RTP/UDP does not mandate congestion control by reducing the packet transmission rate.

The format of a general-purpose feedback packet defined by RFC 4585 is shown in FIG. 5a. It includes, among other things, a feedback message type (FMT) field, which identifies the type of the feedback (transport layer feedback message, payload-specific feedback messages, or application layer feedback messages), and a Feedback Control Information (FCI) field, which is any additional information included in the feedback message for the different types of feedback. If multiple types of feedback messages need to be conveyed, then several RTCP feedback messages must be generated.

Where the feedback packet is a NACK packet (ACK packets are excluded from later versions of RFC 4585), the FCI field comprises a packet identifier (PID) field and a bitmask of following lost packets (BLP) field (16 bits) (shown in FIG. 5b). The BLP allows for reporting losses of any of the 16 RTP packets immediately following the RTP packet indicated by the PID. Bit i of the bit mask is set to '1' if the receiver has not received RTP packet number (PID+i); bit i is set to '0' otherwise. However, the sender must not assume that a receiver has received a packet because its bit mask is set to 0. All the sender knows is that the receiver has not reported them as lost at this time.

In view of these shortcomings, a need exists for improved ways to determine network conditions based on more accurate feedback information, to facilitate better control of data transmission and hence quality of service.

SUMMARY

In one embodiment, there is provided a method of controlling a transmission rate of a data stream by a server transmitting the data stream to a client device over a network, the method comprising receiving a feedback message from the client, the feedback message containing information indicating a positive or negative acknowledgement of receipt for each one of a plurality of data packets of the data stream; calculating values of a plurality of metrics, wherein each of said values is indicative of transmission quality of the network and is calculated based at least in part on the information contained in the feedback message, and wherein the values include a first value of a first metric representing packet loss; and adjusting the transmission rate if at least one of the values satisfies a corresponding condition; wherein the first metric is prioritized among the plurality of metrics such that an adjustment of the transmission rate responsive to a second value of a second metric satisfying the corresponding condition is conditional on the first value of the first metric not satisfying the corresponding condition.

Providing for positive and negative acknowledgments of receipt of each one a plurality of data packets within a single feedback message reduces network resource usage and allows for good scalability without reducing reliability.

In one embodiment, the adjusting comprises using one of the values that satisfies the corresponding condition to determine a new transmission rate. Using the calculated value to adjust the transmission rate ensures an accurate response to network conditions.

In data streams for which transmitted data packets number in the hundreds of thousands or even millions, shifting the burden of error detection onto the receiver significantly reduces the workload of the sender. Thus, this approach can be of particular benefit to servers that handle sizable data streams and large concurrent user loads, such as streaming servers in an IPTV system.

Different transmission quality measures can be determined based on the information contained in the feedback message. Low packet loss is critical to providing high quality real-time streaming video for example, since the error propagation properties of interframe video coding mean that a single lost packet can cause quality degradation that can last in the order of a second depending on the encoding parameters. Thus it is advantageous to give priority to the packet loss value in adjusting the transmission rate. It will be appreciated that the values can be calculated and analysed in any order.

In one embodiment, the second metric represents one of a packet delay and a retransmission rate. In one embodiment, the second metric represents packet delay and the plurality of metrics includes a third metric representing retransmission rate, wherein the second metric is prioritized over the third metric.

In one embodiment, the corresponding condition comprises one of crossing a threshold value and the calculated value being greater than a previous calculated value. Crossing a threshold may include meeting or exceeding a threshold, or falling outside a range of values. It will be understood that a relative decrease in the calculated value may 'exceed' a threshold or previously calculated value.

Although the transmission rate may be increased or decreased by means of the calculated value, in one embodiment the adjustment comprises a decrease. This allows a relatively high reference transmission rate to be set, and, if possible, maintained, with downward adjustments being made where necessary. Thus the condition can serve as an indication of when an unacceptable transmission quality is encountered.

In one embodiment, using one of the values that satisfies the corresponding condition to determine a new transmission rate comprises selecting a numerical value from a corresponding set of numerical values, each of said numerical values representing an amount by which the transmission rate can be adjusted. This allows transmission rates to be optimized in advance for a given system. In one embodiment, each value has a corresponding set of numerical values. For example, a critical value such as packet loss may have a larger range of numerical values (i.e. may result in greater reductions in the transmission rate) than less critical value such as retransmission rate.

In one embodiment, the packet loss metric is calculated as the number of positive acknowledgements divided by the sum of the number of positive and negative acknowledgements. In one embodiment, the packet delay metric is calculated as a change in the number of delayed positive acknowledgements divided by the number of transmitted packets, for a given time interval. In one embodiment, the packet retransmission metric is calculated as a change in the number of retransmitted packets divided by the number of transmitted packets, for a given time interval. To ensure that decisions are based on up-to-date and accurate information, in one embodiment the time interval is between consecutive receipts of feedback messages, for example each time the feedback message is received.

In one embodiment, the method further comprises receiving a further feedback message from the client containing information indicating a buffer fill level, and wherein the transmission rate is adjusted based on the buffer fill level if each of said plurality of values does not satisfy the corresponding condition.

In one embodiment, adjusting the transmission rate based on the buffer fill level comprises mapping the buffer fill level to one of a plurality of predetermined buffer fill level regions, each region having an assigned adjustment value; and multiplying the transmission rate by the corresponding adjustment value to determine a new transmission rate.

In one embodiment, the plurality of buffer fill level regions comprises at least a first region for which a reduction in transmission rate is to be performed (e.g. a buffer overflow condition) and a second for region for which an increase in transmission rate is to be performed (e.g. a buffer underflow condition). Thus, the buffer fill level may be used for determining whether an increase in the transmission rate is feasible.

In one embodiment, the method further comprises checking that the new transmission rate does not exceed a reference transmission rate prior to performing the adjustment.

In one embodiment, the reference transmission rate is based on either a detected bandwidth or a weighted average bit rate.

Thus a method of rate adaptation is provided in which the transmission rate can be changed dynamically according to network condition indicators and the buffer fill level of the client, to smooth the transmission jitter and ensure good quality of service.

In one embodiment there is provided an apparatus for transmitting a data stream, the apparatus comprising transmission means configured to transmit packets of data to a client over a network at an adjustable transmission rate; and a transmission rate controller configured to receive a feedback message from the client, the feedback message containing information indicating a positive or negative acknowledgement of receipt for each one of a plurality of data packets of the data stream; calculate values of a plurality of metrics, wherein each of the values is indicative of transmission quality of the network and is calculated based at least in part on the information contained in the feedback message, and wherein the values include a first value of a first metric representing packet loss; and adjust the transmission rate if at least one of the values satisfies a corresponding condition; wherein the first metric is prioritized among the plurality of metrics such that an adjustment of the transmission rate responsive to a second value of a second metric satisfying the corresponding condition is conditional on the first value of the first metric not satisfying the corresponding condition.

In one embodiment, the transmission rate controller is configured to adjust the transmission rate using one of the values that satisfies the corresponding condition to determine a new transmission rate.

In one embodiment, the second metric represents one of a packet delay and a retransmission rate. In one embodiment, the second metric represents packet delay and the plurality of metrics includes a third metric representing retransmission rate, wherein the second metric is prioritized over the third metric.

In one embodiment, the transmission rate controller is configured to adjust the transmission rate by selecting a numerical value from a corresponding set of numerical values, each of the numerical values representing an amount by which the transmission rate can be adjusted.

In one embodiment, the transmission rate controller is configured to calculate the first value as the number of positive acknowledgements divided by the sum of the number of positive and negative acknowledgements. In one embodiment, the transmission rate controller is configured to calculate the value of the second metric representing packet delay as a change in the number of delayed positive acknowledgements divided by the number of transmitted packets, for a given time interval. In one embodiment, the transmission rate controller is configured to calculate the value of the third metric representing retransmission rate as a change in the number of retransmitted packets divided by the number of transmitted packets, for the given time interval.

In one embodiment, the transmission rate controller is configured to receive a further feedback message from the client containing information indicating a buffer fill level, and to adjust the transmission rate based on the buffer fill level if each of said plurality of values does not satisfy the corresponding condition.

In one embodiment, the transmission rate controller is configured to adjust the transmission rate based on the buffer fill level by mapping the buffer fill level to one of a plurality of predetermined buffer fill level regions, each region having an assigned adjustment value; and multiplying the transmission rate by the corresponding adjustment value to determine a new transmission rate.

In one embodiment, the plurality of buffer fill level regions comprises at least a first region for which a reduction in transmission rate is to be performed and a second for region for which an increase in transmission rate is to be performed.

In one embodiment, the transmission rate controller is configured to check that the new transmission rate does not exceed a reference transmission rate prior to performing the adjustment.

In one embodiment, the reference transmission rate is based on either a detected bandwidth or a weighted average bit rate. The detected bandwidth may be received from the client.

In one embodiment, there is provided a method of controlling a transmission rate of a data stream by a server transmitting the data stream to a client device over a network, the method comprising receiving a feedback message from the client, said feedback message containing information indicating a positive or negative acknowledgement of receipt for each one of a plurality-of data packets of the data stream; calculating a value indicative of transmission quality of the network, based at least in part on said information contained in said feedback message; determining whether said value satisfies a condition; decreasing a current transmission rate by an amount determined using said value if said value satisfies said condition, and otherwise increasing the current transmission rate; and repeating said calculating, said determining and said decreasing or increasing for subsequent ones of said feedback messages received from the client.

This iterative method allows the transmission rate to be kept at a level which is very close to the available bandwidth, thus making full utilization of bandwidth. Types of degradation include network congestion or overload. Using a feedback message containing information indicating a positive or negative acknowledgement of receipt for each one of a plurality of data packets of the data stream allows a number of values to be calculated that provide a precise indication of network conditions. Thus the transmission rate can be accurately controlled.

In one embodiment, the value is of one of a first metric representing packet loss, a second metric representing packet delay, and a third metric representing retransmission rate.

In one embodiment, the first metric is prioritized among the metrics such that a decrease of the transmission rate using a second value of the second metric or using a third value of the third metric is at least conditional on a first value of the first metric not satisfying the condition.

In one embodiment, decreasing the current transmission rate by the amount determined using the calculated value comprises selecting one of a plurality of predetermined numerical values.

In one embodiment, there is provided an apparatus for transmitting a data stream, the apparatus comprising transmission means configured to transmit packets of data to a client over a network at an adjustable transmission rate; and a transmission rate controller configured to: receive a feedback message from the client, said feedback message containing information indicating a positive or negative acknowledgement of receipt for each one of a plurality of data packets of the data stream; calculate a value indicative of transmission quality of the network, based at least in part on said information contained in said feedback message; determine whether said value satisfies a condition; decrease a current transmission rate by an amount determined using said value if said value satisfies said condition, and otherwise increasing the current transmission rate; and repeat said calculating, said determining and said decreasing or increasing for subsequent ones of said feedback messages received from the client.

In one embodiment, the value is of one of a first metric representing packet loss, a second metric representing packet delay, and a third metric representing retransmission rate.

In one embodiment, the first metric is prioritized among the metrics such that a decrease of the transmission rate using a second value of the second metric or using a third value of the third metric is at least conditional on a first value of the first metric not satisfying the condition.

In one embodiment, the transmission controller is configured to decrease the current transmission rate by selecting one of a plurality of predetermined numerical values using the calculated value.

In one embodiment, there is provided an apparatus for receiving a data stream from a server over a network, the apparatus comprising receiving means configured to receive data packets of the data stream; a buffer for buffering received data packets; a feedback controller configured to: detect when data packets are missing from the received data stream; generate a feedback message containing information indicating a positive or negative acknowledgement of receipt of each one a plurality of data packets; and send the generated feedback message to the server.

In one embodiment, the feedback controller may be configured to monitor the buffer fill level, and generate a further different feedback message containing information indicating the buffer fill level.

In one embodiment, there is provided a system comprising an apparatus for transmitting a data stream according to any one of the foregoing paragraphs and an apparatus for receiving a data stream according to any one of the foregoing paragraphs.

Embodiments can be implemented by software on a general purpose computer or in a combination of software and hardware. Thus any of the 'means' defined above can be implemented as code modules in any combination in a computer.

In one embodiment, there is provided a computer program product which may be embodied in a passive storage medium, and which configures a computer to perform a method defined in any one of the paragraphs above. Here, the term computer may encompass a computer with dedicated hardware.

Embodiments may be provided in the form of a computer program product on a carrier medium, which may be embodied in a passive storage medium such as an optical or magnetic medium, or in an electronic medium such as a mass storage device (e.g. a FLASH memory), or in a hardware device implemented to achieve execution of instructions in accordance with certain embodiments, such as ASIC, an FPGA, a DSP or the like. Alternatively the carrier medium can comprise a signal carrying the computer program code such as an optical signal, an electrical signal, an electromagnetic signal, an acoustic signal or a magnetic signal. For example, the signal can comprise a TCP/IP signal carrying the code over the Internet.

Without loss of generality, modified RTCP application-defined packets (APP packets) are suitable feedback messages for carrying the positive and negative acknowledgement information. This is because, firstly, the packet comprises a flexible and extensible format, and, secondly, the reporting period is not fixed. This means that the reporting period can differ in accordance with system requirements. Similarly, the use of modified RR packets are advantageous because such packet types are periodic and more suitable for reporting certain statistics such as buffer level.

As used herein the term 'negative acknowledgement of receipt' can cover, for example, both receipt with irreparable errors and no receipt at all.

As used herein the term 'client' refers to a computer's general role as a receiver of a data stream, which refers to audio, video, graphics files (in uncompressed or compressed format), icons, software, text files and scripts, data, binary files and other computer-usable data used to operate a client and produce desired audio-visual effects on the client for a viewer. Thus a client can comprise a computer apparatus configured in accordance with software.

As used herein the term 'server' refers to a computer's general role as a transmitter of a data stream. It will be understood that terms such as 'a server' or 'a streaming server' do not exclude the possibility of the provision of more than one of these units. For example, a server may be a set of servers in a cluster that can be presented as a single server or "virtual" server to the client. Thus a server can comprise a computer apparatus configured in accordance with software.

BRIEF DESCRIPTION OF THE DRAWINGS

Further aspects, features and advantages will become apparent to the reader of the following description of specific embodiments, provided by way of example only, with reference to the accompanying drawings, in which:

FIGS. 3A to 3C are sequence diagrams of three possible scenarios for handling data packet retransmission according to embodiments;

FIG. 4 schematically shows the format of a feedback message according to an embodiment;

FIGS. 5A and 5B show the format of a prior art feedback message;

DETAILED DESCRIPTION OF EMBODIMENTS

System Architecture

Figure 1:
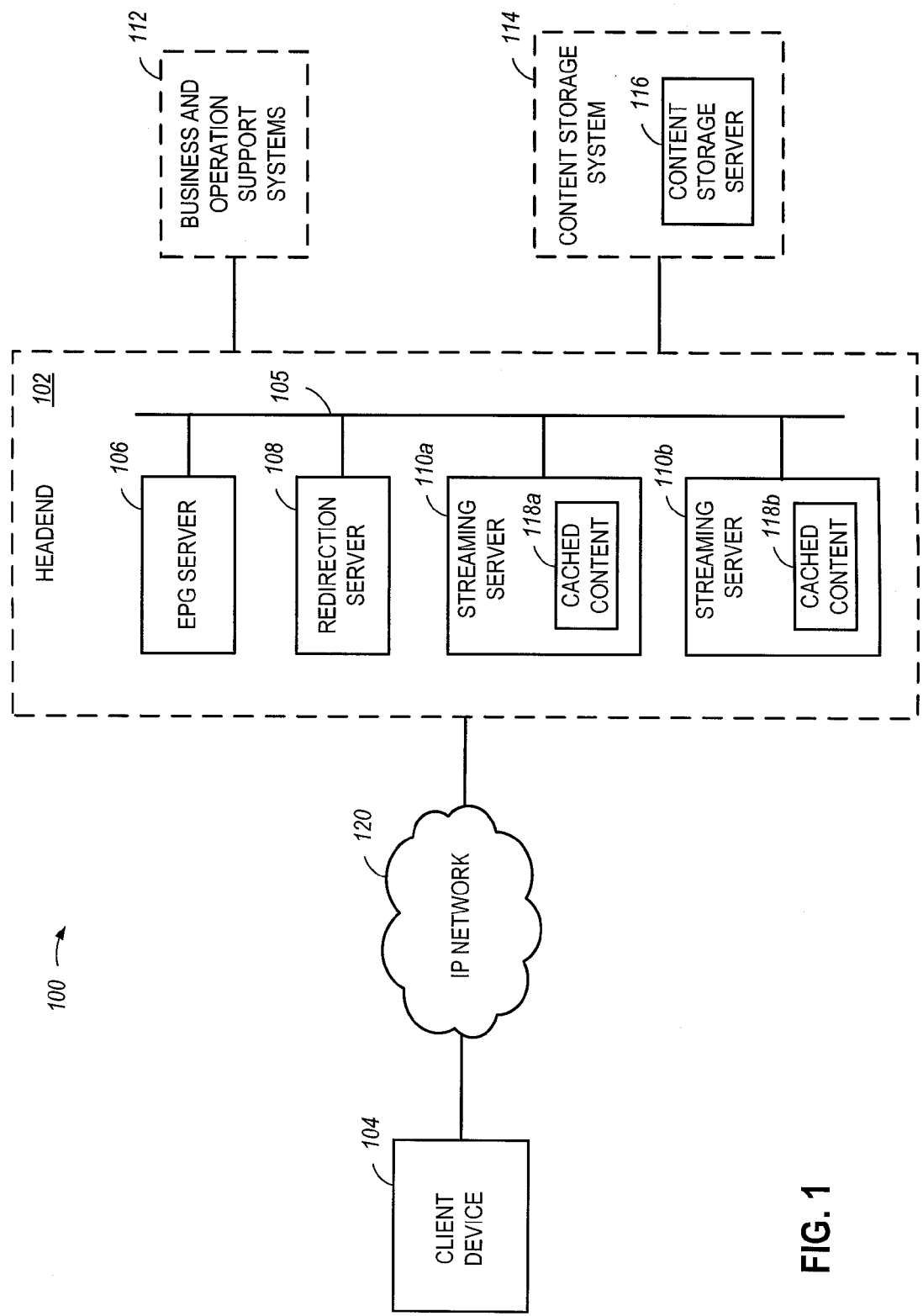
FIG. 1 is a simplified network diagram of a system for delivering content to a client according to an embodiment.

FIG. 1 is a simplified network diagram of a content delivery system 100 in which streaming media content can be delivered to a client device 104, such as a set-top box. An exemplary system is an IPTV system that can support Video on Demand (VOD), Live TV, and Pay-Per-View (PPV).

The system 100 comprises a headend 102, including an Electronic Program Guide (EPG) server 106, a redirection server 108, and one or more streaming servers 110a, 110b, which are connected through an Ethernet or other communication network 105.

The headend 102 is also connected to backend business and operation support systems 112. These provide functionalities such as billing and customer management, authentication, authorization and accounting (AAA), and system management including performance analysis.

The EPG server 106 is a portal of IPTV service, providing information to the client 104 in the form of an on-screen guide for example. This allows a user to navigate, select and search for content by time, title, live channel and the like.

A redirection server 108 supports control protocols such as the Real Time Streaming Protocol (RTSP), which functions as a 'network remote control' for regulating access to content by redirecting the client 104 to a streaming server. The redirection server may also include preventive measures to guard against attacks from outside the system.

Requested content, such as video, is delivered by a streaming server 110a, 110b to the client device using a data protocol such as MPEG-4 (H.264), ISMA/MPEG-2 TS, or RTSP/RTCP/RTP/SDP, over IP-network 120. Typically, each server can provide between 1,000 and 10,000 concurrent streams of high-resolution video application.

Content is provided to the streaming servers 110a, 110b from a content storage system 114 comprising content storage servers 116. An exemplary content storage system is a Storage Area Network (SAN). Selected content can be stored in cache 118a, 118b at the streaming servers 110a, 110b.

Figure 2:
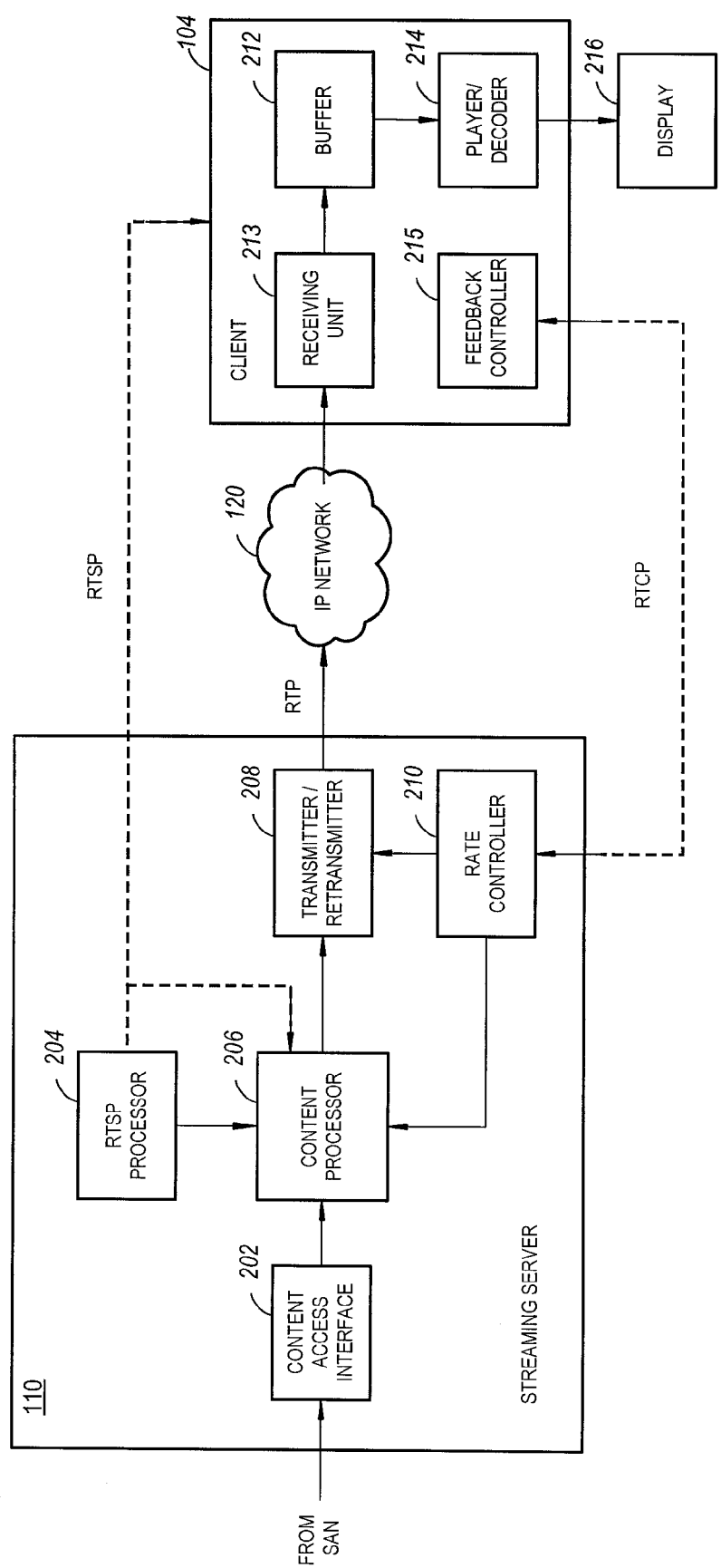
FIG. 2 schematically shows in more detail the components and interactions of a server and client of the system shown in FIG. 1.

FIG. 2 shows in more detail the components and interactions (information flow) of a streaming server and client of the system of FIG. 1.

The streaming server 110 architecture comprises a service layer, a server core layer, a media content layer and a protocol layer. The service layer and server core layer are not shown for the sake of clarity. However, it is noted that the service layer provides service modules to handle service scheduling, authentication, billing, net management, administration and so on. These service modules are built over the server code. The service layer can also provide common modules such as configuration, logger and communication interface and the like. The server core layer can be based on a multi-thread architecture and thread pool mode, use technologies of I/O multiplex, event driver, task scheduling, inter-process communication, and so on, to facilitate a large number of concurrent connections.

The media content layer comprises a content access interface 202 to allow access to media data residing on a Storage Area Network (SAN) over a high-bandwidth I/O channel (data may also be stored locally in cache). The protocol layer comprises RTSP processor 204, data processor 206, data transmitter/retransmitter 208 and rate controller 210.

RTSP processor 204 receives RTSP requests from the client 104. The requests are delivered to data processor 206, which processes the working logic of, e.g. Video-on-Demand, services, and encapsulates retrieved data content (via interface 202) in RTP format. Content transmitter/retransmitter 208 transmits and, where necessary, retransmits the packetized data to the client 104 over the network 120. The server may also includes a transmit cache and retransmit cache (as will be described in due course with reference to FIG. 11), though these are not shown here for purposes of clarity.

At the client side, data received at a receiving unit 213 is placed in a playback buffer 212 until it is ready to be decoded and played by means of decoder/player 214, which outputs media content to a display 216 for a user. A feedback controller 215 monitors the receipt of data packets to detect when data packets are missing, and generates feedback messages containing information indicating whether data packets have been received or not and information about the buffer fill level, and sends the messages to the server using RTCP.

System Operation

Broadly speaking, the streaming server implements two techniques for providing Quality-of-Service control: 1) Lost packet retransmission, and 2) Flow control. These will now be discussed in turn.

1. Lost Packet Retransmission

Lost packet retransmission helps to ensure accurate data delivery. It can be implemented by using the RTP protocol to add control information such as timestamps and packet sequence numbers into UDP packets. For convenience, this section is divided into two parts: 1.1) Detection and reporting of out-of-sequence packets; and 1.2) Selective retransmission.

1.1 Detection and Reporting of Out-of-Sequence Packets

The header of a conventional RTP data packet includes, among other things, a timestamp and a sequence number. The sequence number increments by one for each RTP data packet that is sent, thus allowing for out-of-sequence error detection. In particular, errors can be determined by checking the continuity of packet sequence numbers at the receiver side. Consecutively arriving packets having non-contiguous sequence numbers indicates that packet loss has occurred. For example, if packet i+2 arrives after packet i, it can be inferred that data packet i+1 has been lost.

Out-of-sequence error detection at the receiver can respond well to occasional out-of-sequence errors. It can even respond well to continuous packet-loss (burst-loss) errors, since the interval between consecutive burst-loss events is typically much shorter than the buffering time at the receiver side. However, only the arrival of new packets subsequent to a burst-loss event indicates that the network is no longer congested. Thus, where the network is congested, a request from the client device for retransmission of data packets in response to burst-loss only adds to the network congestion, which is undesirable.

A simple mechanism to determine whether to resend data packets will now be described with reference to FIGS. 3A to 3C, which are sequence diagrams of three possible scenarios for handling data packet retransmission.

In FIG. 3A, the server sends a data packet (Packet 1) to the client and sets a timer for retransmission (step S302a). At step S304a, receipt of the packet is acknowledged by the client using an ACK message (ACK 1). Upon receiving the acknowledgment, the server can stop the timer for Packet 1 (step S306a) as it is satisfied that the data packet has successfully reached the client.

If the server does not receive an ACK message for a corresponding data packet before the timer expires, one of two possible events has occurred, namely, either the data packet sent from the server has been lost en route to the client (FIG. 3B, step S302b), or the corresponding ACK message sent from the client to the server has not arrived (FIG. 3C, steps S302c and S304c). In either case, the server resends the packet and resets the timer (step S308b; step S308c). As before, the timer is stopped upon receipt of the corresponding ACK messages from the client (steps S304b and S306b; steps S310c and S306c).

The use of one ACK message per data packet is not an efficient utilization of network resources or processing time, in particular as the client may have to resend ACK messages (FIG. 3C).

In an embodiment, client devices feed back information about multiple data packets. Accordingly, a new RTCP application-defined packet (APP packet) is defined, having the format shown in FIG. 4. The new APP packet is based on the generic APP packet format defined by the RTCP standard (though notably the feedback information it contains is different, as discussed below).

Generic APP packets include fields for identifying the version of RTP being used (V), for padding (P); for allowing a set of APP packets to be defined under one unique name or any other application-dependent data (subtype); for identifying the packet type (PT); for identifying the length of the APP packet (length); for identifying the synchronization source/contributing source of the payload contained in the packet (SSRC/CSRC); and for providing a name unique to the set of APP packets relative to other APP packets the application might receive (name ASCII).

Also specified by RTCP is an optional application-dependent data field for conveying information specific to a particular media type or application (i.e. it is interpreted by the application and not RTP itself).

In an embodiment, the application-dependent data field comprises a sequence number field, a bit mask (or bit map), and bit mask number. The sequence number field holds the Lowest Sequence Number (LSN) of a group of data packets, such as a series of N consecutive data packets.

LSN can be calculated at the client as:

$$LSN_{CurrentStatisticalPeriod} = 1 + (HSN_{LastStatisticalPeriod}),$$

where $LSN_{CurrentStatisticalPeriod}$ is the LSN of the RTP packet for a current statistical period and $HSN_{LastStatisticalPeriod}$ is the Highest Sequence Number (HSN) of the RTP packet received in the previous statistical period.

The statistical period can be defined as the time interval between two consecutive APP packets. Though this statistical period may preferably be fixed, to about 125 ms for example, it need not be. As such, the number of data packets represented by the bit mask can vary.

The bit mask is a collection of bits that can be constructed based on the knowledge that the sequence numbers of data packets increment by one for consecutive data packets. Thus, if a packet is received, the corresponding bit of the bit mask can be marked as '1' (ACK); if a packet is not received, the corresponding bit of the bit mask can be marked as '0' (NACK).

The bit mask number allows the server to detect lost feedback messages and more accurately control transmission rate adaptation. Furthermore, by grouping acknowledgements in a single feedback message is more efficient and consumes less network resources.

In contrast to the feedback messages defined in RFC 4585 (Extended RTP profile for RTCP-based feedback) and RFC 4588 (Retransmission payload format), the herein described modified APP packet allows for reporting of both positive and negative acknowledgements of receipt in a single feedback message and provides for a large, variable length bit mask size (for example, up to the maximum UDP packet size, which is typically 1492 bytes).

1.2 Selective Retransmission

In an embodiment, retransmission can be implemented at the server by means of an RTP transmitter/retransmitter, which transmits/retransmits lost packets and maintains a transmission/retransmission cache. After packing and sending data packets from a transmission cache, the data packets that have just been sent are copied to the retransmission cache. It will be apparent that, to make way for new packets, some packets currently residing in the retransmission cache must be discarded.

Thus, on the one hand, the server must ensure that those data packets which are required to perform effective retransmission remain in the retransmission cache. On the other hand, data packets that are of no use to the client device should not remain in the retransmission cache. In particular, a data packet should arrive at the client device just in time for play of the media content which it contains, even when a buffer is used at the client.

For example, supposing that the playback rate at the client is 25 frames per second, and that the media player is currently playing the data of packet $P_i$. Then, the next 1 second's worth of data, including packet $P_{i+26}$, arrives at the client and is pushed into the buffer. However, packet $P_{i+25}$ has not been received. One second later, it is time for packet $P_{i+25}$ to be processed for playing. At that point in time this packet has not been received by the client, so even if this packet subsequently arrives, it is of no use to the client since its corresponding playing time has passed. Therefore, packet $P_{i+25}$ must be abandoned from the retransmission cache to make space for new, useful packets.

To address the above mentioned issues, packet lifetime and retransmission timeout strategies are applied at the server to each data packet.

Each data packet has a lifetime which starts when it is first copied into the retransmission cache and which naturally expires after a fixed period of time, for example after a 3.5 second residency in the retransmission cache. Each packet also has a retransmission timeout period, after which time it is automatically retransmitted to the client device if no acknowledgement is received. The retransmission timeout period is typically less than the packet lifetime, to allow for multiple retransmissions before packet expiry (e.g. in the event of loss of APP packets or retransmitted data packets). A typical retransmit timeout period value is 1.5 seconds.

Packet lifetime and retransmission timeout are implemented at the server as follows:
1. Where no feedback is received during a packet's lifetime, the packet is deemed to be 'expired'. The packet is discarded from the retransmission cache. Such a situation could arise if either the data packet or the feedback message is lost.
2. Where feedback is received during the packet's lifetime, and the feedback indicates that the data packet has been received by the client device (ACK), it has fulfilled its role and so is discarded from the retransmission cache.
3. Where feedback is received before the retransmission timeout period runs out, and the feedback indicates that the data packet has not been received (NACK), the data packet is retransmitted and the timeout period is reset.
4. Where no ACK feedback is received within the timeout period, the data packet is considered to be delayed. The data packet is retransmitted and the timeout period is reset.

2. Flow Control/Rate Adaptation

To ensure that the server does not send data faster than the network or client can handle, a flow control scheme is implemented. The described scheme implements congestion control and rate control techniques that allow the server to dynamically change the rate at which data is sent to the client based on calculated parameters that are indicative of network conditions and the fill level of the client's playback buffer.

Figure 6:
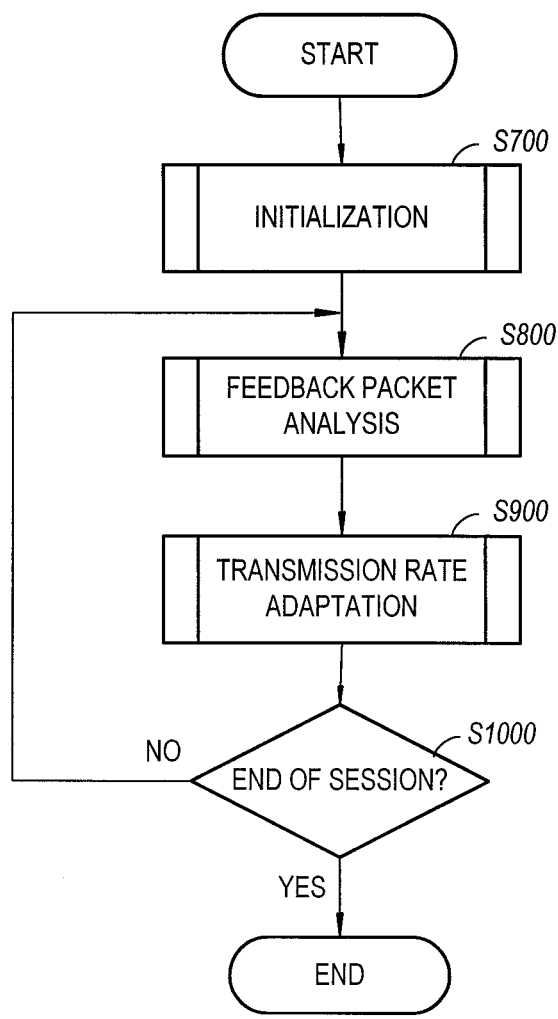
FIG. 6 is a flow diagram of a flow control method according to an embodiment.

FIG. 6 is a flow diagram of a flow control method according to an embodiment of the invention. The method comprises three stages: initialization (step S700), feedback packet analysis (step S800) and transmission rate adaptation (step S900). Control packet analysis, and, if appropriate, rate adaptation, is typically performed for each statistical period (the time interval between consecutive feedback messages) and for the duration of a session, which is determined at step S1000. It will be appreciated that transmission and retransmission of data packets is an ongoing process, which for reasons of clarity are not depicted in the FIGS. 6 to 9.

2.1 Initialization

The initialization process (S700) serves three basic purposes: to determine a bandwidth between the server and the client; to determine an average transmission bit rate for the content that is to be streamed to the client; and to determine a reference transmission bit rate.

Figure 7:
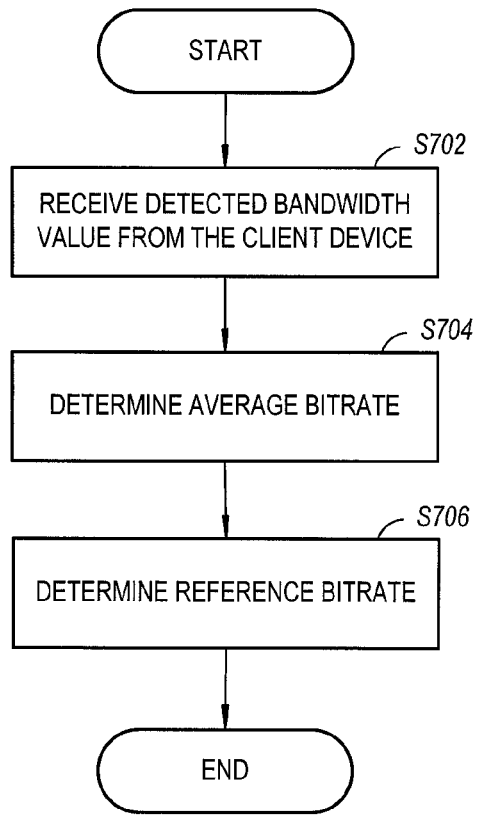
FIG. 7 is a flow diagram of the initialization process of the flow control method shown in FIG. 6.

FIG. 7 is a flow diagram of the initialization process performed at the streaming server.

The bandwidth between the server and the client is detected at the client when it connects to the server for the first time in a session. One approach of testing the bandwidth is for the client and server to have a TCP/UDP conversation. The conversation is initiated by the client sending a TCP/UDP package to the server. The time of receipt of the first response is recorded. The server can keep on sending messages until a conversation time-out is reached. At that point, the server ends the conversation with a "goodbye" message of some kind. The time of receipt of the goodbye message is recorded by the client. The bandwidth can then be computed according to the total packages received and the elapsed time.

The detected bandwidth, DetectedBw, is reported to the server at step S702. As there may be some variation between the detected and actual bandwidth values, caused for example by instantaneous network jittering and network delay during the period of bandwidth detecting, the detected value is considered to be a nominal bandwidth value. For this reason, the transmission bit rate (including any adaptations) should preferably not exceed the nominal bandwidth.

At step S704 an average transmission bit rate, AvgBitrate, for the data which is to be transmitted (e.g. a movie) is calculated, using the equation:

$$AvgBitrate = \frac{DataSize}{Duration}$$

where DataSize is the total data size and Duration is the duration or broadcasting time of the data.

A reference transmission bit rate, RefBitrate, which is the rate at which data is initially transmitted, is then determined using the following logic algorithm (step S706):

```
if DetectedBw > AvgBitrate × w then
    RefBitrate = AvgBitrate × w
else RefBitrate = DetectedBw
end if
``` where w is an empirically determined weight factor, an exemplary value of which is 1.3.

Although data can be transmitted at the AvgBitrate so that the transmission rate matches the playback rate, this does not always make the best use of network resources. Using a weight factor allows for an aggressive strategy to be implemented that can increase utilization of the bandwidth during favourable network conditions. The risk that such a strategy could lead to packet loss is minimised by the fact that the transmission rate can be adjusted almost immediately based on received feedback.

Average Bit Rate (ABR) encoding is preferred over Variable Bit Rate (VBR) encoding. This provides advantages in terms of smoothing the bit rate and reducing jitter, while also providing better video quality than Constant Bit Rate (CBR) encoding 2.2 Control Packet Analysis The second stage of flow control, feedback packet analysis (S800), provides real-time information relating to network conditions.

Figure 8:
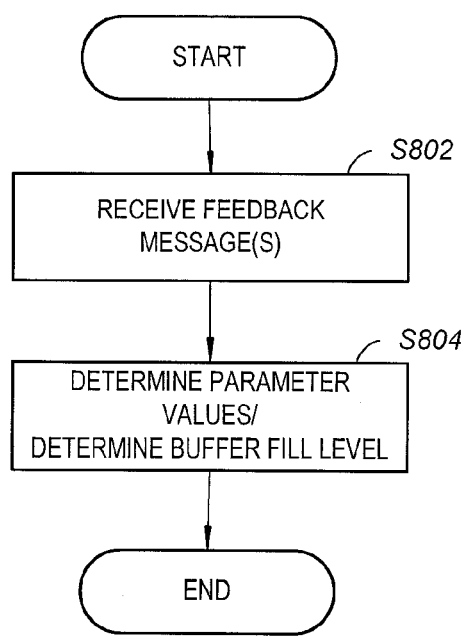
FIG. 8 is a flow diagram of the analysis process of the flow control method shown in FIG. 6.

FIG. 8 shows a flow diagram of the analysis process. The process begins at step S802 with the receipt of a feedback message (or messages) sent from the client. By determining various parameters based on an analysis of the feedback packet(s) (step S804), the server can then calculate a value or values of one or more metrics indicative of transmission quality (discussed in the next section).

In view of the limitations described in the Background section, the network delay and fraction lost parameters reported using the RR packet are not used in the preferred embodiment. Rather, the modified APP packets, which have been described previously, are analysed.

Another source of information is the buffer fill level, which in this case is reported in a profile-specific extension field of the RR packet.

Turning first to the analysis of the extended RR packet, the client's buffer fill level provides an indication of the ratio between the server-side production of packets and the client-side consumption of packets.

If there is a decrease in the fill level, it can be inferred that the playback rate of the client is higher than the average receiving rate. This could be due to the transmission rate of the server being too slow, or if the client rendered high dynamic range (HDR) data in a previous statistical period. Rendering high dynamic range data, such as a dynamic video scene, requires more picture information, which means that the frame size is greater than usual. In other words, for a given amount of data stored in the playing buffer, the total number of frames decreases as the number of HDR data video increases. Since the player's rendering speed is usually fixed (for example at 25 frames per second), the player will consume data more quickly in high dynamic scenes than in low ones for a given time period, and the buffer fill level will decrease accordingly.

If there is an increase in the fill level, it can be inferred that, for a given period of time, the playback rate of the client is lower than the average receiving rate. This could be due to the transmission rate of the server being too fast or the client rendering low dynamic range video in a previous statistical period.

Therefore, the server can reduce the transmission rate when the client buffer's fill level increases, and increase the transmission rate when the client buffer's fill level decreases.

It will be understood that keeping the buffer fill level high can lead to an overflow for the replay buffer and, as a result, incoming packets cannot be pushed into the buffer and will be dropped. On the other hand, keeping the buffer fill level low can lead to an underflow of the replay buffer and, as a result, the player cannot play the content at a normal speed because it is starved of data.

In terms of analysing the modified APP packet, it has already been noted that it is undesirable to use the Fraction Lost value transmitted in RR packets as an indicator of the network environment. Some of the parameters which can be determined (step S804) and used instead are listed below. These provide a more accurate picture of network conditions since the values are calculated after packets have been retransmitted.

| Parameter | Description |
| --- | --- |
| NumNoACKs | The number of lost packets: data packets whose positive acknowledgement (ACK) is not received during the packet's lifetime. Also referred to as expired packets. |
| NumDelayedACKs | The number of delayed packets: data packets whose positive acknowledgement (ACK) is received during the packet's lifetime (3.5 s), but only after a period of delay (MaxDelay). MaxDelay can be an empiric value, for example 2.5 s. Recalling that the retransmission timeout is about 1.5 s, it will be apparent that these packets been retransmitted at least once. |
| NumRetransmits | The number of retransmitted packets: sum of the data packets whose negative acknowledgement (NACK) is received before retransmission timeout (1.5 s) and the data packets whose acknowledgement (ACK and NACK) is not received before retransmission timeout (1.5 s). In all cases, retransmission will be required. This value represents the number of retransmits for a statistical period. |
| NumACKs | The number of received packets: data packets whose positive acknowledgement (ACK) is received. |

Certain measures can be implemented to detect the loss of APP packets, such as sequence numbering. Thus, when the server detects an out-of-sequence APP packet, it can request the client to retransmit the APP, by means of an Sender Report (SR) packet for example. However, a more straightforward strategy is simply to assume that data packets, for which the corresponding APP packet is lost, are also lost. This means that the calculated value for lost packets may be a little higher than the actual value, but not to such a degree that the reliability of the system is significantly affected.

2.3 Transmission Rate Adaptation

Figure 9:
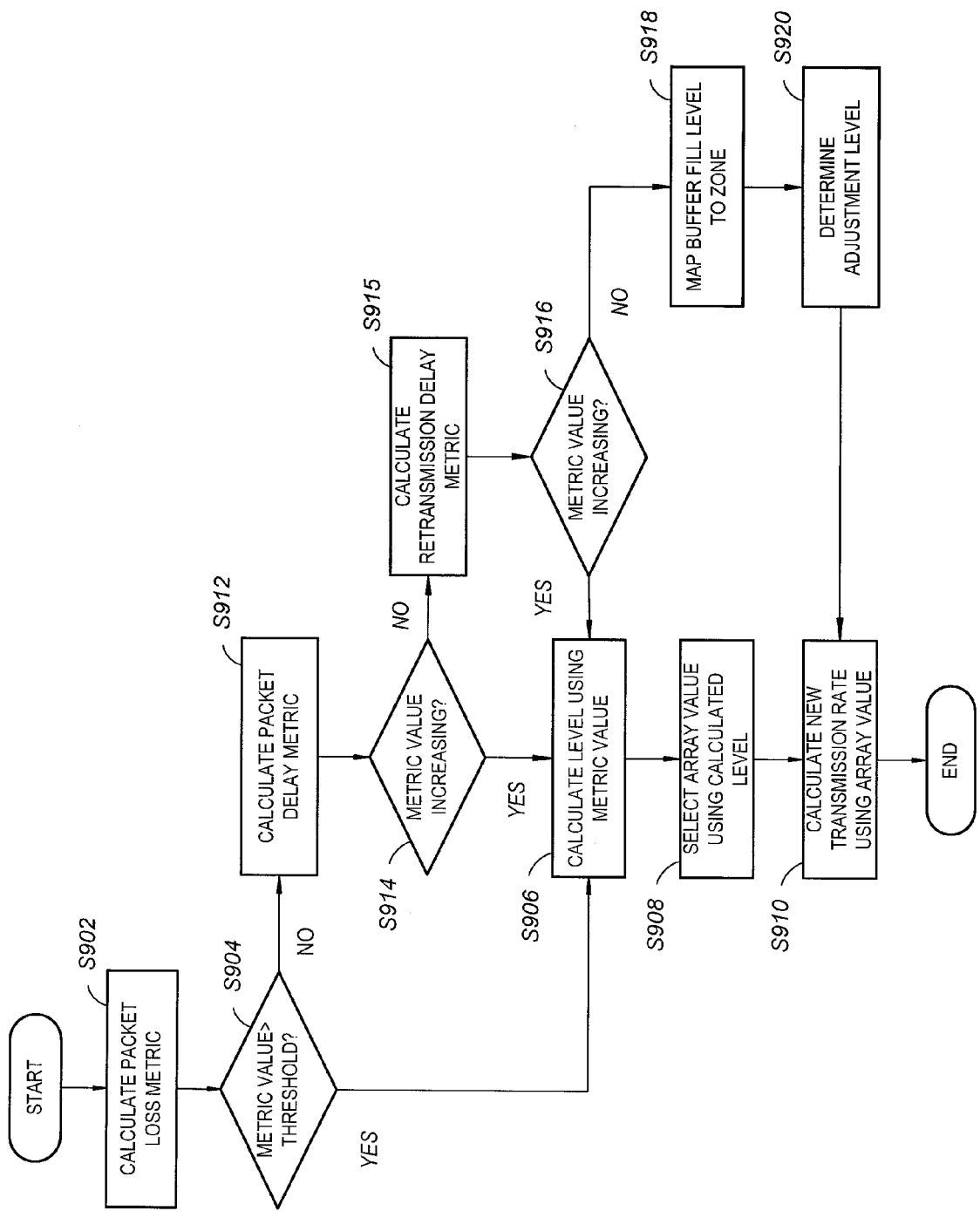
FIG. 9 is a flow diagram of the transmission rate adaptation process of the flow control method shown in FIG. 6.

FIG. 9 is a flow diagram of the transmission rate adaptation process. During this proves, the rate at which data is transmitted to the client can be dynamically adapted according to network conditions.

The parameters defined above are used to calculate a value or values of one or more metrics: PacketLossMetric, PacketRetransmissionMetric, and PacketDelayMetric. The calculation of these metrics is discussed in more detail below.

The general principles of the rate adaptation strategy can be summarised as follows.

As packet loss is a critical factor affecting quality of service, the packet loss metric has the highest priority. If packet loss increases sharply, it can be inferred that the network is becoming worse. Timely transmission rate adaptation is required.

In a low packet loss situation, the priority of the packet delay metric has priority over the packet retransmission metric. If packet delay keeps increasing, it can be inferred that the transmission rate may be too high, and if packet retransmissions are increasing, packet loss can occur.

If none of these situations arise, then detection of the buffer fill level of the client can be used. If the buffer fill level is at a high level or close to overflow, the transmission rate needs to be slowed down. If the buffer fill level is at a low level or close to underflow, the transmission rate needs to be increased. Any intended increase in transmission rate should be compared to nominal bandwidth to ensure that it is not exceeded.

Alternatively, or in addition to the foregoing scenarios, the transmission rate may be adjusted based on the retransmission buffer.

Describing the rate adaptation strategy now in more detail, it will be recalled that a data packet is deemed lost if its positive acknowledgement is not received within its lifetime. At step S902, the packet loss metric is calculated as $$PacketLossMetric = \frac{NumNoACKs}{(NumNoACKs + NumACKs)}.$$

This is an accurate and sensitive indicator of network transmission degradation or failure. Data packets which are currently being transmitted, which is to say data packets that are on their way to the client device, are ignored.

Depending on the calculated value of the PacketLossMetric, a new transmission rate can be calculated in accordance with one of two scenarios.

2.3.1 Scenario 1

If packet loss in the network (i.e. the calculated value) is greater than a threshold (typically determined according to the system requirements, e.g. 0.005) (step S904 'YES'), the server will reduce the transmission rate. To determine the reduction in transmission rate, a packet loss level is determined (step S906), according to:

PacketLossLevel=PacketLossMetric×100.

The PacketLossLevel is used as a vector subscript to select an element from an array of elements that represent amounts or step sizes by which the transmission rate may be reduced. An exemplary array is:

PacketLossArray[ ]={0.007, 0.025, 0.03, 0.03, 0.04, 0.04, 0.04, 0.05, 0.05, 0.06}, where the first element of the array (0.007) is the $0^{th}$ element, and the last element of the array (0.06) is the $(n-1)^{th}$ element (here, n=10). The elements of the array can be determined based on empirical data, for example based on estimates or theoretical analysis, and fine-tuned during testing of a given system.

Generally, the PacketLossLevel value is a float value and not an integer ranging from 0 to 9 (as required in order to select one of the $0^{th}$ to $9^{th}$ elements of the array). The calculated value can therefore be rounded off according to a set of boundaries:

| PacketLossLevel Boundaries | Calculated PacketLossLevel Float Value | Rounded off Integer Value( ) |
|---|---|---|
| >0.01 | 0.** | 0 |
| 0.01 to >0.02 | 1.** | 1 |
| ... | ... | ... |
| 0.09 to >0.10 | 9.** | 9 |
| ≥0.10 | ≥10.00 | 9 |

As the calculated value cannot exceed the highest available integer ('9' in this case), it can be rounded down according to:

```
if PacketLossLevel > 9 then
    PacketLossLevel = 9
end if.
```

By way of example, if the calculated PacketLossLevel is '1.12', the rounded off integer value becomes '1' and PacketLostArray[PacketLossLevel]=0.025. Thus, the integer value is the index number that picks out the desired element in the array and determines the speed down rate (step S908):

SpeedDownRate=PacketLostArray[PacketLossLevel].

Finally, the new transmission rate is calculated in step S910 as:

NewRate=CurrentRate×(1−SpeedDownRate)

2.3.2 Scenario 2

If at step S904 it is determined that packet loss is relatively low (i.e. the metric is smaller than the threshold), then a decision on rate adaptation can be taken based on the PacketRetransmissionMetric or PacketDelayMetric. Three conditions can be imagined:

Condition 1

If the number of delayed packets (NumDelayedACKs parameter) increases relative to the number of transmitted packets, it can be inferred that network transmission conditions are degrading.

Thus, at step S912, the PacketDelayMetric can be calculated as:

$$PacketDelayMetric = \frac{\delta\ NumDelayedACKs}{NumPacketsSentDuringInterval}$$

where δ NumDelayedACKs is a change in the number of delayed ACKs between a current statistical period and a previous statistical period (a statistical period is the time interval between two consecutive feedback messages), and NumPacketsSentDuringInterval is the number of packets sent during the current statistical period. As a comparison is being made to a previous statistical period, the calculated packet delay metric value is compared to a previously calculated value to determine whether there is an increase (step S914).

If so, and based on the obtained value, a packet delay level can be calculated (step S906) as:

PacketDelayLevel=PacketDelayMetric×100.

As before, an array for packet delay is introduced,

PacketDelayArray[ ]={0.007, 0.01, 0.02, 0.02, 0.02, 0.03, 0.03, 0.03, 0.04, 0.04}, and a speed down rate is determined (step S908) as:

SpeedDownRate=PacketDelayArray[PacketDelayLevel].

The new transmission rate is then calculated (step S910) according to:

NewRate=CurrentRate×(1−SpeedDownRate).

It will be noted that the numerical value range of the packet delay array is somewhat smaller than that of the packet loss array (0.007 to 0.04 compared with 0.007 to 0.06), based on the fact that an increase in packet delay is less critical than an increase in packet loss.

Condition 2

When the number of packets which are to be retransmitted (NumRetransmits parameter) increases relative to the number of transmitted packets, it can be inferred that the network environment is about to degrade.

Thus, if it is determined that packet delay is not increasing (step S914 'NO'), the PacketRetransmissionMetric can be calculated (step S915) as:

$$PacketRetransmissionMetric = \frac{\delta\ NumRetransmits}{NumPacketsSentDuringInterval}$$

where δ NumRetransmits is a change in the number of retransmitted packets between a current statistical period and a previous statistical period (a statistical period is the time interval between two consecutive feedback messages), and NumPacketsSentDuringInterval is the number of packets sent during the current statistical period. As a comparison is being made to a previous statistical period, the calculated packet retransmission metric value is compared to a previously calculated value to determine whether there is an increase (step S916).

If so, and based on the obtained value, a packet retransmission level can be calculated (step S906) as:

PacketRetransmissionLevel=PacketRetransmissionMetric×100.

As before, an array for packet retransmission is introduced,

PacketRetransmissionArray[ ]={0.00, 0.00, 0.00, 0.00, 0.00, 0.01, 0.01, 0.02, 0.02, 0.03} and a speed down rate is calculated is determined (step S908) according to:

SpeedDownRate=PacketRetransmissionArray[PacketRetransmissionLevel].

Finally, a new transmission rate is calculated (step S910) according to:

NewRate=CurrentRate×(1−SpeedDownRate).

Once again, it will be noted that numerical value range (0.00 to 0.03) of the packet retransmission array has diminished.

Condition 3

When the aforementioned conditions are not met (steps S904, S914, and S916 is 'NO'), it can be inferred that the current environment of the network transmission is acceptable, and the transmission rate can be adapted based on the client buffer's fill level. The client uses the buffer to smooth the jitter and delay of the network, and can feedback the fill level as described earlier.

Three fill zones are defined. Depending on which zone the fill level falls into, different rate adaptations can be made (steps S918 and S920), as summarised in the table below.

| Zone Name | Zone Boundary | Status and adaptation to be performed | Adjustment Rate (AdjustRate) |
|---|---|---|---|
| Z1 | Over 80 | Overflow; an immediate reduction in rate is required | 0.8 |
| Z2 | 60 to 80 | Close to overflow; a slight reduction in rate is recommended | 0.9 |
| Z3 | Under 60 | Normal or underflow; a trial increment in rate can be performed | 1.02 |

Thus, when the fill level is in either of zones Z1 and Z2, a reduction in the transmission bit rate is performed; when the fill level is in zone Z3, a trial increment may be performed. The calculation (step S910) is according to:

NewRate=CurrentRate×AdjustRate.

A determination as to whether to perform a trial increment can be based on observing buffer conditions over several cycles (i.e. several intervals between RR feedback messages). In particular, a condition indicator and a condition counter are introduced.

The condition indicator indicates whether a speed-up is acceptable. When this condition is satisfied (SpeedUpAcceptable=TRUE) for several contiguous cycles, incremental adaptation can be performed. The number of contiguous cycles is counted by the counter. When a condition for which speed-up is not acceptable is encountered (SpeedUpAcceptable=FALSE), the counter is reset to zero. When the counter reaches a threshold value, e.g. 3, the incremental rate adaptation is performed (subject to an adjustment check).

Adjustment Check

A check is implemented to ensure that any intended increase in bitrate does not exceed the reference bitrate RefBitrate (see 2.1 'Initialization'), which is usually fixed for a server-client session. The check is performed by comparing the calculated NewBitrate to the reference bitrate RefBitrate. If the calculated NewBitrate is greater than the RefBitrate, then NewBitrate is set to RefBitrate. Otherwise, the calculated NewBitrate is used.

2.3.3 Optimising Usage of Available Bandwidth

The foregoing sections have provided specific examples of how network conditions can be accurately determined and how the transmission rate can be throttled down in response to determining that the network conditions are degrading (an exception to this is when the buffer fill level is below the low watermark and the transmission rate can be increased, though it will of course be apparent that the transmission rate could also be increased based on the calculated values). However, although network congestion is usually the main reason for sudden decreases in buffer fill level, the buffer fill level it is not necessarily the most accurate indicator of network conditions. The use of buffer fill level in determining whether the transmission rate can be increased is therefore not necessarily an efficient use of network resources, in particular available bandwidth. The calculated lost packet, packet delay and packet retransmission values are suitable indicators of the boundary between acceptable and unacceptable network conditions. In this way, it is possible to increase the transmission rate in order to maximise utilization of the available bandwidth and use the calculated values as a check to ensure that the boundary is not crossed. In effect, by using the feedback messages sent from the client devices the streaming server can periodically probe the upper transmission rate for given available bandwidth.

Figure 10:
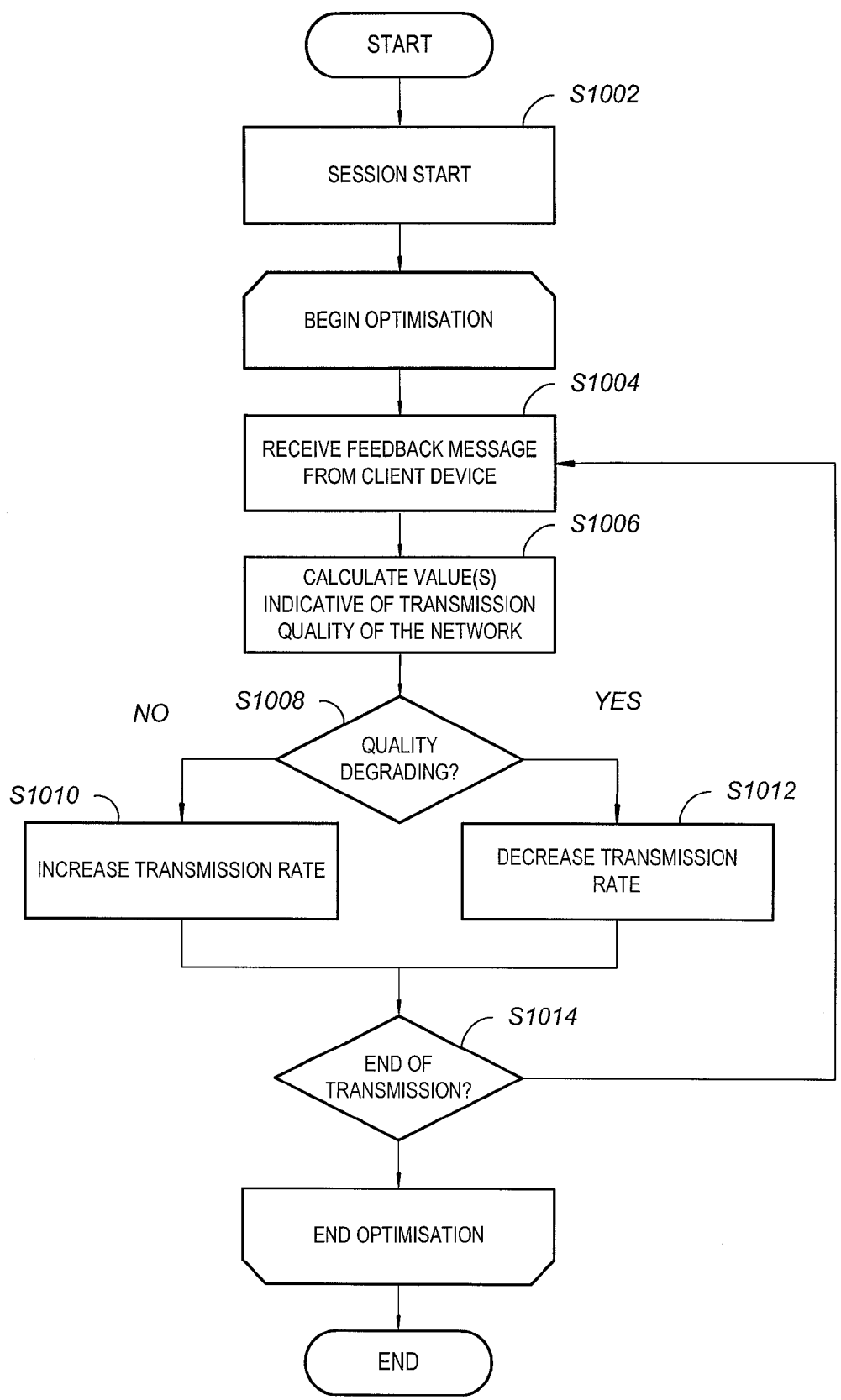
FIG. 10 is a flow diagram of transmission rate optimisation during the transmission of a data stream according to an embodiment.

FIG. 10 is a flowchart showing a process for optimising bandwidth usage. The process begins at step S1002 when the server-client session begins. This step may comprise an initialization step as described with reference to FIG. 7. One the session is established, an iterative process commences. The optimisation process begins at step S1004 with the receipt of a feedback message from the client device, such as described previously. At step S1006, one or more values indicative of the transmission quality of the network is determined based on the information contained in the message, e.g. the ACKs and NACKs. These values can include the aforementioned packet loss, packet delay, and retransmission rate values. If the values indicate that transmission quality is acceptable (step S1008, NO), which is to say that a condition such as the value crossing a threshold is not met, then the transmission rate is increased (step S1010). The increase can be an incremental increase. Otherwise, in cases where the state has deteriorated, the transmission rate is decreased at step S1012. The decrease is commensurate to the value calculated in step S1006. This is achieved by using the calculated value to determine the amount of decrease. Thus, a large packet loss value will result in a larger decrease than a small packet loss value. This means that the rate is always maintained close the bandwidth limit. At step S1014, it is determined whether the transmission has finished. If not, the method returns to step S1004. Thus each iteration of the iterative process may correspond to the time interval between receipt of successive feedback messages (though it is not limited thereto), and may comprise one or more steps of the process described with reference to FIG. 9.

In this approach, the streaming server does not need to take available bandwidth into account per se and it is assumed that the bandwidth of the streaming server is not the bottleneck of its performance for streaming media data. This allows the inclusion of multiple Network Interface Cards (NICs) to the streaming server and which are much cheaper than adding multiple CPUs. This values CPU load more than NIC load.

Mirror Buffer

Figure 11:
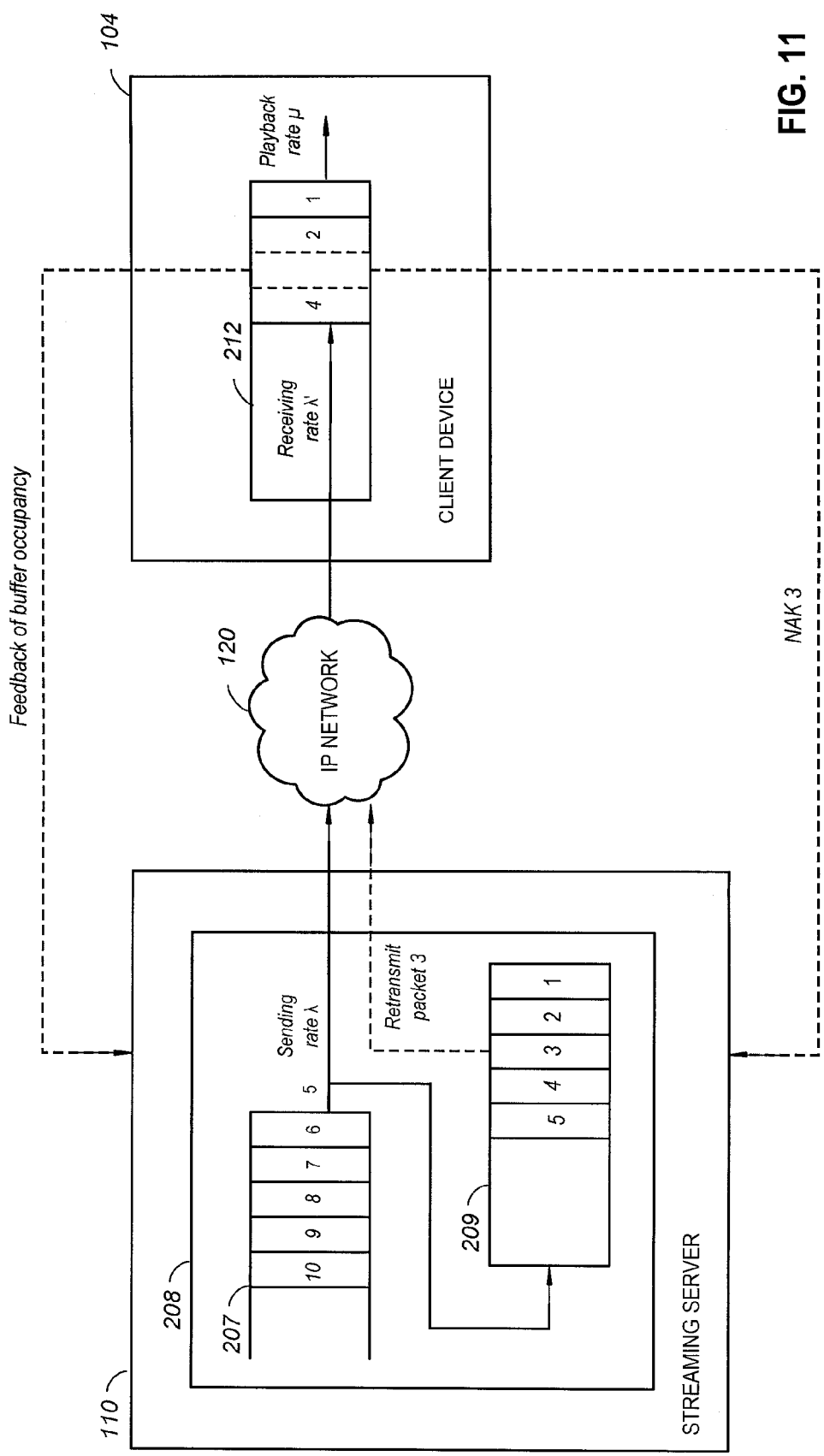
FIG. 11 schematically shows in more detail the components and interactions of a server and client of the system according to an embodiment.

Although in foregoing embodiments the client's buffer fill level is obtained by the streaming server from feedback received from the client, in other embodiments the client's buffer fill level can be estimated by the server using a mirror buffer. FIG. 11 schematically shows the principles of this concept. The elements and interactions shown in FIG. 11 can be incorporated into the systems shown in FIGS. 1 and 2, and same elements are denoted using the same reference numerals. It will be appreciated that other configurations are possible and that certain elements are not shown for reasons of clarity. The streaming server 110 shown in FIG. 11 includes a transmitter/retransmitter 208 including a transmission buffer 207 and a retransmission buffer 209. A stream of packets is queued in the transmission buffer, with packet 5 being transmitted to the client device 104 over network 210 at a sending rate λ. Transmitted packets are copied into the retransmission buffer 209, for possible retransmission to the client device 104. For example, packet 3 has not been received (or is unreadable) by client device 104, as shown by its absence in the client's buffer 212. The client device can send a negative acknowledgement (NACK), for example using the modified packet structure described above with reference to FIG. 4, indicating (among other things) that packet 3 has not been received (recall that packets may be numbered so that the client device knows when to expect a particular packet). Alternatively, an individual NACK packet could also be sent. In response, the server can retransmit packet 3. The client device may also feed back information about the buffer occupancy level to rate controller 210 (not shown in FIG. 11) for use in adjusting the transmission rate, as described previously. The retransmission buffer 209 mirrors the receiver buffer 212 and so can be used in addition or alternatively to the aforementioned techniques to adapt the transmission rate. For example, although the buffers of the server may have a greater capacity than that of the client device, the same capacity may be allocated with the same fill zones as defined for the receive buffer 212.

While the described methods and apparatus can provide particular advantages to IPTV-type system, they are also applicable to other content delivery systems, for example web server systems. Thus, the client need not be a set-top box, and other embodiments including desktop computers, laptops, handheld computing devices, mobile phones, games consoles and digital recording devices are also contemplated.

Embodiments of the streaming server may communicate with the client using wireless (Wi-Fi, WiMAX) or wired technology (telephone lines/fiber optic lines), or a combination of the two technologies. Thus, the transmission means can be any one or more elements suitable for operating using such technologies.

It will be understood that the transmission rate controller and feedback controller can include any or a combination of discrete electronic components, discrete logic circuit(s) having logic gates for implementing logic functions upon data signals, an application specific integrated circuit having appropriate logic gates, a programmable gate array(s) (PGA), a filed programmable gate array (FPGA), and so on.

The calculated metrics needs not be limited to packet loss, delayed packets and retransmitted packets, though these are clearly advantageous. Furthermore, metrics could be assigned a relative weighting, for example where two or more metrics are used in adjusting the transmission rate. It will also be understood that the metrics can be evaluated using other criteria, and that the described metrics are not limited to the particular comparison criteria of the examples. Thus terms such as 'a criterion' do not exclude the possibility of the provision of more than one criterion.

Although above embodiments are described in the context of RTP/RTCP, it will be understood that any suitable protocol could be used for including UDP/RTP unicast, UDP/RTP multicast, HTTP, RTSP, MMS, RTMP, File, and so on. Thus, the acknowledgement feedback message need not be a modified APP packet and can be any suitable packet for carrying acknowledgement information. Similarly, the buffer fill level information does not need to be carried in an RR packet.

Although advantageous, the positive and negative acknowledgements need not be in the form of "1s" and "0s" of a string of bits in which each data packet is represented as an individual bit. A notation that represents a set of consecutive positive or a set of consecutive negative bits could also be implemented for example. Further, different types of positive and negative acknowledgements (e.g. received with errors) could be used.

Although above embodiments define a statistical period as the time interval between two received feedback messages, other time intervals could be used.

Although in the embodiments described above, adjusting the transmission rate based on the buffer fill level is conditional on packet loss, packet delay and packet retransmission values falling within specified conditions (e.g. below a threshold), in other embodiments the buffer fill level can be used as an alternative, or complementary (but separate), criterion for controlling the transmission rate.

Although in the embodiments described above, adjusting the transmission rate based on the packet loss, packet delay and packet retransmission values includes using the value to select a numerical value from a corresponding set of numerical values, it will be understood that the new transmission rate can be determined in other ways. For example, the streaming server may determine an amount by which to adjust the transmission rate independent of the determined value(s).

In the detailed description above, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Further, in describing representative embodiment of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied. For example, all three metrics could be calculated at the same time and evaluated at the same time. If more than two metrics meet the criterion or criteria, one of these can be selected, for example based on priority.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by those skilled in the art in light of the teachings and guidance.

The breadth and scope of the present invention should not be limited by any of the above-described specific embodiments, and it will be apparent to a skilled person in the art that modifications lie within the spirit and scope of the appended claims.

The invention claimed is:

1. A method of controlling a transmission rate of a data stream by a server transmitting the data stream to a client device over a network, the method comprising:
receiving a feedback message from the client, the feedback message containing information indicating a positive or negative acknowledgement of receipt for each one of a plurality of data packets of the data stream;
calculating values of a plurality of metrics, said values including a first value of a first metric representing packet loss and at least one of a second value of a second metric representing delayed packets and a third value of a third metric representing retransmission rate, wherein said values are calculated based on said information contained in said feedback message;
determining if one or more of said values satisfies a corresponding criterion;
if the determination is affirmative, decreasing the transmission rate using a value that satisfies the corresponding criterion, wherein said first metric is prioritized over the second and third metrics such that the transmission rate is decreased using said first value if the corresponding criterion is satisfied, and wherein if the first value does not satisfy the corresponding criterion, then the transmission rate is decreased using the second value if the corresponding criterion is satisfied, and if the first value and the second value do not satisfy the corresponding criterion, then the transmission rate is decreased using the third value if the corresponding criterion is satisfied; and
providing a retransmission buffer in the server for storing a copy of the data packets transmitted to the client such that the retransmission buffer mirrors a receiver buffer of the client, wherein responsive to receipt of the feedback message from the client the method further comprises:
comparing the occupancy of the retransmission buffer and the receiver buffer,
if the occupancy levels are not the same, retransmitting one or more packets that are not present in the receiver buffer from the retransmission buffer to the client.

2. A method according to claim 1, wherein decreasing the transmission rate comprises selecting a numerical value from a set of numerical values, each numerical value representing an amount by which the transmission rate can be adjusted.

3. A method according to claim 2, wherein each metric has a corresponding set of numerical values.

4. A method according to claim 1, wherein the first value of the first metric representing packet loss metric is calculated as the number of positive acknowledgements divided by the sum of the number of positive and negative acknowledgements.

5. A method according to claim 1, wherein the second value of the second metric representing packet delay is calculated as a change in the number of delayed positive acknowledgements divided by the number of transmitted packets, for a given time interval.

6. A method according to claim 1, wherein the third value of the third metric representing retransmission rate is calculated as a change in the number of retransmitted packets divided by the number of transmitted packets, for the given time interval.

7. A method according to claim 1, further comprising receiving a further feedback message from the client containing information indicating a buffer fill level, and wherein the transmission rate is adjusted based on the buffer fill level if each of said plurality of values does not satisfy the corresponding criterion.

8. A method according to claim 7, wherein adjusting the transmission rate based on the buffer fill level comprises:
mapping the buffer fill level to one of a plurality of predetermined buffer fill level regions, each region having an assigned adjustment value; and multiplying the transmission rate by the corresponding adjustment value.

9. A method according to claim 8, wherein the plurality of buffer fill level regions comprises at least a first region for which a reduction in transmission rate is to be performed and a second region for which an increase in transmission rate is to be performed.

10. A method according to claim 9, further comprising checking that the result of the multiplying does not exceed a reference transmission rate prior to performing the adjustment.

11. A method according to claim 10, wherein the reference transmission rate is based on either a detected bandwidth or a weighted average bit rate.

12. A non-transitory storage medium carrying computer readable code for controlling a computer to carry out the method of claim 1.

13. The method of claim 1, wherein the transmission rate is decreased using the second value if the corresponding criterion is satisfied and if the first value does not satisfy the corresponding criterion.

14. A method according to claim 1, wherein said corresponding criterion comprises at least one of the criterion that the calculated value exceeds a previous value thereof and the criterion that the calculated value crosses a threshold.

15. A method according to claim 1, wherein said values are calculated for a time interval between consecutive receipts of feedback messages.

16. An apparatus for transmitting a data stream, the apparatus comprising:
   transmission means configured to transmit packets of data to a client over a network at an adjustable transmission rate; and
   a transmission rate controller configured to:
   receive a feedback message from the client, the feedback message containing information indicating a positive or negative acknowledgement of receipt for each one of a plurality of data packets of the data stream;
   calculate values of a plurality of metrics, said values including a first value of a first metric representing packet loss and at least one of a second value of a second metric representing delayed packets and a third value of a third metric representing retransmission rate, wherein said values are calculated based on said information contained in said feedback message;
   determine if one or more of said values satisfies a corresponding criterion;
   if the determination is affirmative, decrease the transmission rate using a value that satisfies the corresponding criterion, wherein said first metric is prioritized over the second and third metrics such that the transmission rate is decreased using said first value if the corresponding criterion is satisfied, and wherein if the first value does not satisfy the corresponding criterion, then decrease the transmission rate using the second value if the corresponding criterion is satisfied, and if the first value and the second value do not satisfy the corresponding criterion, then decrease the transmission rate using the third value if the corresponding criterion is satisfied;
   the apparatus further comprising a retransmission buffer in the server for storing a copy of the data packets transmitted to the client, such that the retransmission buffer mirrors a receiver buffer of the client;
   wherein, responsive to receipt of the feedback message from the client, the transmission rate controller is further configured to:
   compare the occupancy of the retransmission buffer and the receiver buffer; and
   if the occupancy levels are not the same, retransmit one or more packets that are not present in the receiver buffer from the retransmission buffer to the client.

17. An apparatus according to claim 16, wherein the transmission rate controller is configured to decrease the transmission rate comprises using said value, or one of the values to select a numerical value from a set of numerical values, each numerical value representing an amount by which the transmission rate can be adjusted.

18. An apparatus according to claim 17, wherein each metric has a corresponding set of numerical values.

19. An apparatus according to claim 16, wherein the transmission rate controller is configured to calculate said the first value of the first metric representing packet loss metric as the number of positive acknowledgements divided by the sum of the number of positive and negative acknowledgements.

20. An apparatus according to claim 16, wherein the transmission rate controller is configured to calculate the second value of the second metric representing packet delay as a change in the number of delayed positive acknowledgements divided by the number of transmitted packets, for a given time interval.

21. An apparatus according to claim 16, wherein the transmission rate controller is configured to calculate the third value of the third metric representing retransmission as a change in the number of retransmitted packets divided by the number of transmitted packets, for the given time interval.

22. An apparatus according to claim 16, wherein the transmission rate controller is configured to receive a further feedback message from the client containing information indicating a buffer fill level, and wherein the transmission rate is adjusted based on the buffer fill level if each of said plurality of values does not satisfy the corresponding criterion.

23. An apparatus according to claim 22, wherein the transmission rate controller is configured to adjust the transmission rate based on the buffer fill level by:
   mapping the buffer fill level to one of a plurality of predetermined buffer fill level regions, each region having an assigned adjustment value; and
   multiplying the transmission rate by the corresponding adjustment value.

24. An apparatus according to claim 23, wherein the plurality of buffer fill level regions comprises at least a first region for which a reduction in transmission rate is to be performed and a second region for which an increase in transmission rate is to be performed.

25. An apparatus according to claim 23, wherein the transmission rate controller is configured to check that the new transmission rate does not exceed a reference transmission rate prior to performing the adjustment.

26. An apparatus according to claim 25, wherein the reference transmission rate is based on either a detected bandwidth or a weighted average bit rate.

27. A non-transitory storage medium carrying computer readable code for configuring a computer as the apparatus of claim 16.

28. An apparatus according to claim 16, wherein the transmission rate controller is configured to decrease the transmission rate using the second value if the corresponding criterion is satisfied and if the first value does not satisfy the corresponding criterion.

29. An apparatus according to claim 16, wherein said corresponding criterion comprises at least one of the criterion that the calculated value exceeds a previous value thereof and the criterion that the calculated value crosses a threshold.

30. An apparatus according to claim 16, wherein said values are calculated for a time interval between consecutive receipts of feedback messages.

31. A method of controlling a transmission rate of a data stream by a server transmitting the data stream to a client device over a network, the method comprising:
receiving a feedback message from the client, said feedback message containing information indicating a positive or negative acknowledgement of receipt for each one of a plurality of data packets of the data stream;
calculating values of a plurality of metrics, each of said values indicative of transmission quality of the network, based at least in part on said information contained in said feedback message, said values including at least one of a first metric representing packet loss, a second metric representing delayed packets, and a third metric representing retransmission rate;
determining whether the calculated value satisfies a criterion;
if the determination is affirmative, decreasing a current transmission rate by selecting a numerical value from a set of predetermined numerical values using said calculated value, wherein each numerical value of said set of predetermined numerical values represents an amount by which the transmission rate can be decreased;
repeating said calculating, said determining and said decreasing for subsequent ones of said feedback messages received from the client;
providing a retransmission buffer in the server for storing a copy of the data packets transmitted to the client such that the retransmission buffer mirrors a receiver buffer of the client, wherein responsive to receipt of the feedback message(s) from the client the method further comprises:
comparing the occupancy of the retransmission buffer and the receiver buffer, and
if the occupancy levels are not the same, retransmitting one or more packets that are not present in the receiver buffer from the retransmission buffer to the client.

32. A method according to claim 31, wherein, if said determination is negative, increasing the current transmission rate, if a buffer level is not exceeded.

33. An apparatus for transmitting a data stream, the apparatus comprising:
transmission means configured to transmit packets of data to a client over a network at an adjustable transmission rate; and
a transmission rate controller configured to:
receive a feedback message from the client, said feedback message containing information indicating a positive or negative acknowledgement of receipt for each one of a plurality of data packets of the data stream;
calculate values of a plurality of metrics, each of said values indicative of transmission quality of the network, based at least in part on said information contained in said feedback message, said values including at least one of a first metric representing packet loss, a second metric representing delayed packets, and a third metric representing retransmission rate;
determine whether the calculated value satisfies a criterion;
if the determination is affirmative , decrease a current transmission rate by selecting a numerical value from a set of predetermined numerical values using said calculated value, wherein each numerical value of said set of predetermined numerical values represents an amount by which the transmission rate can be decreased;
repeat said calculating, said determining and said decreasing for subsequent ones of said feedback messages received from the client;
the apparatus further comprising a retransmission buffer in the server for storing a copy of the data packets transmitted to the client, such that the retransmission buffer mirrors a receiver buffer of the client;
wherein, responsive to receipt of the feedback message from the client, the transmission rate controller is further configured to:
compare the occupancy of the retransmission buffer and the receiver buffer; and
if the occupancy levels are not the same, retransmit one or more packets that are not present in the receiver buffer from the retransmission buffer to the client.

34. An apparatus according to claim 33, wherein, if said determination is negative, increasing the current transmission rate, if a buffer level is not exceeded.

35. A system comprising:
a first apparatus for transmitting a data stream according to claim 33; and
a second apparatus for receiving a data stream, including receiving means configured to receive data packets of the data stream, a buffer for buffering received data packets; and a feedback controller configured to: detect when data packets are missing from the received data stream, generate a feedback message containing information indicating a positive or negative acknowledgement of receipt of each one a plurality of data packets, and send the generated feedback message to said apparatus for transmitting.

36. A system according to claim 35, wherein the feedback controller is further configured to monitor a buffer fill level, and generate a further feedback message containing information indicating the buffer fill level.

* * * * *